Patented Aug. 2, 1938

2,125,562

UNITED STATES PATENT OFFICE 2,125,562

CHEWING GUM BASE

George A. Hatherell, Roscoe, Calif., assignor to Frank A. Garbutt, Los Angeles, Calif.

No Drawing. Application July 17, 1936, Serial No. 91,101

5 Claims. (Cl. 99—135)

My invention relates to chewing gum and particularly to gum which is made by compounding a rubber, a resin and other ingredients. The word "rubber" is used herein to include not only natural India rubber but also those synthetic or compounded substances which have the general characteristics of rubber and which are or may become available as substitutes therefor. In the manufacture of gum it is common to produce a base and to compound the commercial gum by adding sweetening and flavoring matter thereto.

It is an object of my invention to produce a chewing gum base which is compounded of novel ingredients and which has characteristics which are distinctly superior to bases produced by previous methods.

My superior base may be produced by various processes, but I have found that the following process gives excellent results. Ordinary rubber latex which is uncoagulated rubber is mixed with about its own weight of a weak aqueous solution of an alkali. The mixture is beaten or agitated to produce a creamy mass.

I then produce a compound resin which may consist of cumarone resin which has been tempered by a petroleum resin. Cumarone resin has already been used in chewing gum, but, as far as I am aware, it has been impossible to produce a gum of satisfactory characteristics using cumarone resin. If a high melting point cumarone resin is used the gum is too hard, and if a low melting point resin is used the gum originally has or quickly develops a bad taste. I have found that a cumarone resin having a melting point around 250° F. may be used with excellent results if a cyclic aromatic petroleum resin is mixed therewith.

While various petroleum resins might be used, I have found that resins of the cyclic aromatic type are particularly adapted for my purpose. Such resins may be produced by various processes, for example, those disclosed in Patents 1,989,045 and 2,029,382 issued to Merrill, and Patent 2,002,004 issued to Gard. Artificial resins that are suitable for my purpose, including those produced by the processes described in said patents, are hereinafter called "cyclic aromatic petroleum resins". This designation is chosen primarily for its convenience, rather than for its chemical accuracy, and denotes a class of resins having the general physical characteristics of the resins produced by the patents above identified. The exact chemical nature of such resins has not been clearly established as far as I am aware. As indicated in the Merrill Patent No. 1,989,045, the melting point of such a resin lies between 100° F. and 150° F. If from 5% to 50% of petroleum resin is mixed with the cumarone resin, a compound resin is produced. If to the creamy mass produced by agitating the latex with alkaline solution I add an emulsion of water and finely divided compound resin and thoroughly mix the latex and resin, I produce an artificial substance which closely resembles some of the natural gums now used in chewing gum bases and which may be used as a base for chewing gum either alone or with other ingredients.

The resinous material may be emulsified in any of the well known methods; for example, it may be melted and mixed with a small quantity of soap and the mixture used to produce an emulsion by mixing with a boiling solution of alkali in water. This resin emulsion is then cooled and added to the latex emulsion previously described. If the mixture of latex and resin emulsion is heated after mixing, the mixture will coagulate into a mass which after being washed and rendered neutral may be used in or as a gum base.

While I prefer to use a compound resin, it is possible to produce a satisfactory product using a cyclic aromatic petroleum resin without the use of any other resin.

In either event, I produce a mechanical mixture which contains rubber and cyclic aromatic petroleum resin. The two substances are not in solution with each other but are mechanically mixed. Such mixtures have many of the qualities which make gum chicle, and the various chicle substitutes now used in chewing gum manufacture, so valuable to the gum manufacturer. Since the latex may be readily freed of foreign matter and the petroleum resin may be readily produced in a very pure state, the resulting base is much smoother and purer than those produced from the natural gums which contain a considerable proportion of foreign matter which cannot be removed without destroying the mechanical structure of the natural gum. Since the chewing qualities of the finished gum depend to a large degree on this structure, it is now common practice to compound chewing gum directly from chicle or chicle substitutes which contain sufficient gritty foreign matter to render the gum slightly abrasive and unpleasant to chew.

A suitable mechanical mixture of rubber and petroleum resin may also be produced by working the petroleum resin into soft coagulated rubber by mechanical means, such, for example, as rollers or calenders.

I claim as my invention:

1. A chewing gum base containing water, rubber, and a cyclic aromatic petroleum resin.

2. A chewing gum base consisting substantially of rubber and resin including cyclic aromatic petroleum resin.

3. A chewing gum base containing rubber, high melting resin, and a lower melting cyclic aromatic petroleum resin.

4. A chewing gum base containing water, rubber, high melting resin, and a lower melting cyclic aromatic petroleum resin.

5. A chewing gum base containing rubber, cumarone resin having a melting point in excess of 200° F. and cyclic aromatic petroleum resin melting below 200° F., the latter resin constituting from 5% to 50% of the combined resin.

GEORGE A. HATHERELL.